United States Patent Office 3,399,634
Patented Sept. 3, 1968

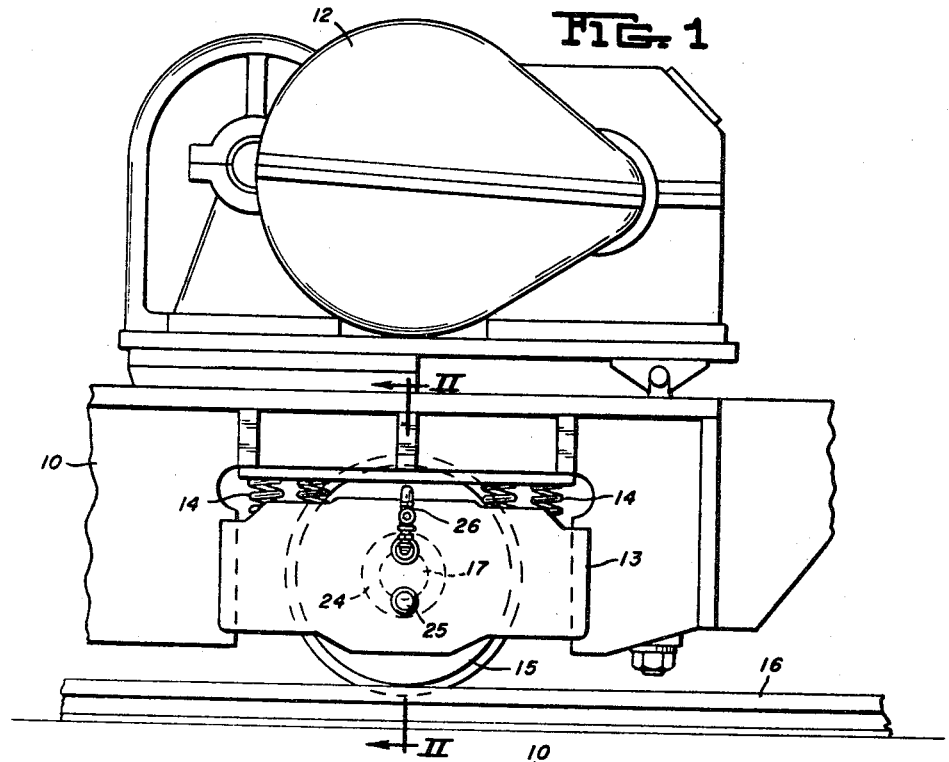
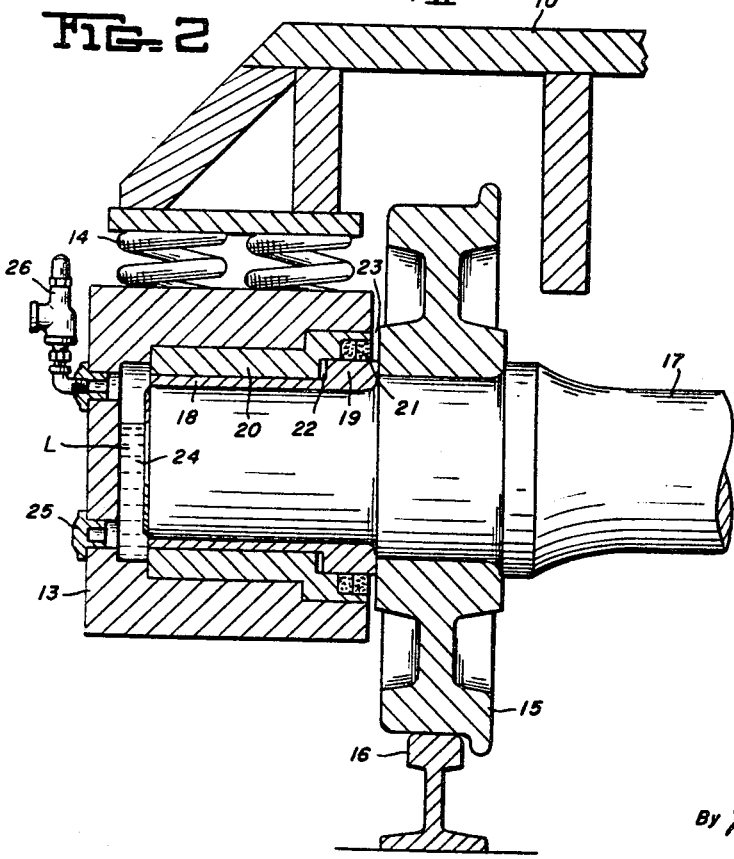
INVENTOR
ANGELO ZUNICH
By Donald G. Dalton
Attorney

3,399,634
MOVEMENT LUBRICATING BEARING ASSEMBLY
Angelo Zunich, Hobart, Ind., assignor to United States Steel Corporation, a corporation of Delaware
Filed Mar. 8, 1966, Ser. No. 532,807
3 Claims. (Cl. 105—218)

ABSTRACT OF THE DISCLOSURE

A journal bearing for rail cars in which the axle carries a removable adapter sleeve and the journal box contains a bronze bearing sleeve receiving the adapter sleeve. The bearing is lubricated by axial movement of the adapter sleeve as it works back and forth endwise in the bearing sleeve. Structure simplifies repairs, since damage normally is confined to the sleeves.

---

This invention relates to an improved journal bearing assembly for rail cars.

Although my invention is not thus limited, my bearing assembly is particularly useful for ingot-tilting cars used in steel mills. The drive mechanism of a conventional ingot-tilting car is supported on the car, and the wheels are mounted on axles which are journaled in roller bearing assemblies. Such cars receive extremely hard usage, and the axles are subjected to end thrust loads which cause frequent and sudden bearing failures, necessitating immediate replacement of the bearing assembly. The usual practice is to remove the entire axle and take it to a machine shop to replace the damaged parts. Quite often the axle itself is damaged and must be replaced or extensively altered, as with a special sleeve arrangement. The car of course is out of service while undergoing such repairs. Nevertheless it is apparent my invention is applicable to other types of cars, especially where similar problems arise.

An object of my invention is to provide an improved bearing assembly which has increased life as compared with the roller bearing assemblies conventionally used on ingot-tilting cars and the like.

A further object is to provide a bearing assembly which is self-lubricating, that is, in which natural movement of the car produces a pumping action to circulate lubricant through the assembly.

A further object is to provide a bearing assembly which is readily dismantled when repairs are necessary, and in which the axle carries a replaceable adapter sleeve to avoid damage to the axle itself.

In the drawing:

FIGURE 1 is a side elevational view of a portion of an ingot-tilting car equipped with my improved bearing assembly;

FIGURE 2 is a vertical sectional view on a larger scale of the bearing assembly on line II—II of FIGURE 1.

FIGURE 1 shows a portion of an ingot-tilting car which includes a frame 10, a drive mechanism 12 mounted on the frame, a journal box 13, springs 14 supporting the frame on the journal box, and a flanged wheel 15. The wheel runs on a rail 16. As best shown in FIGURE 2, the wheel is keyed to a rotatable axle 17. The axle has a journal portion which projects outside the wheel 15 and which I mount in the journal box 13 on a bearing assembly constructed in accordance with my invention. Since the car is conventional, apart from the bearing assembly, no more detailed description is deemed necessary.

My bearing assembly includes an adapter sleeve 18, preferably steel, pressed on the journal portion of axle 17. The end of sleeve 18 nearer the wheel 15 has an integral circumferential flange 19. I press a bearing sleeve 20, preferably bronze, into the journal box 13. The bearing sleeve has a first counterbore which receives the flange 19 of the adapter sleeve 18, and a second counterbore which receives conventional oil seals 21. There is a clearance space 22 between flange 19 and the bottom of the first counterbore. The oil seals encircle flange 19, and there is a clearance space 23 between them and the wheel 15. The bearing sleeve 20 has about an 0.015 inch running fit with the adapter sleeve 18. There is also a space 24 between the end of axle 17 and the end wall of the journal box 13, which space forms an oil reservoir. The end wall of the box has a lower opening into which I fit a removable plug 25, and an upper opening into which I fit a relief valve 26. Preferably the plug and valve are threadedly engaged with the box.

In operation, I partially fill the oil reservoir 24 with a suitable liquid lubricant L. As the car travels along the rails, it wobbles to some extent. Thus the axle 17 and adapter sleeve 18 work endwise back and forth with respect to the bearing sleeve 20 and journal box 13. Such movement produces a pumping action. Lubricant is drawn from the reservoir 24 and distributed over the bearing surfaces between the adapter sleeve and bearing sleeve into the clearance space 22. Movement in the other direction forces this lubricant back between the two sleeves and also around the flange 19. The oil seals 21 prevent loss of lubricant from around the flange. The relief valve 26 allows air to escape from the reservoir.

When it is necessary to repair the bearing assembly, I remove plug 25 and valve 26. I can attach a suitable pulling tool to the journal box 13 at the two openings, and thus pull the box and bearing sleeve 20 from the adapter sleeve 18. Usually any damage is confined to the adapter sleeve or bearing sleeve. I can replace these parts without replacing an entire axle or journal box. Hence I am able to make repairs much more simply and economically than with a conventional bearing assembly.

While I have shown and described only a single embodiment of my invention, it is apparent that modifications may arise. Therefore, I do not wish to be limited to the disclosure set forth but only by the scope of the appended claims.

I claim:
1. In a rail car which includes a rotatable axle, a flanged wheel fixed to said axle, said axle having a journal portion projecting outwardly of said wheel, and a journal box receiving the journal portion of said axle, the combination therewith of a bearing assembly for said axle in said journal box, said assembly comprising an adapter sleeve removably fixed to the journal portion of said axle and having a circumferential flange at the end nearer said wheel, a bearing sleeve fixed within said journal box and having first and second counterbores at the end nearer said wheel, said bearing sleeve rotatably receiving said adapter sleeve, said first counterbore receiving said flange with a clearance space between the flange and the bottom of the counterbore, a lubricant seal surrounding a portion of said flange and received in said second counterbore, said journal box having a lubricant reservoir beyond the end of said axle, said adapter sleeve also having limited axial movement relative to said bearing sleeve to aid in distributing lubricant from said reservoir between the bearing surfaces and into said counterbores.

2. A combination as defined in claim 1, in which said journal box has an opening in its end wall, and further comprising a relief valve mounted in said opening.

3. A combination as defined in claim 2 in which said journal box has a second opening in its end wall below said first-named opening, and further comprising a plug mounted in said second opening, said valve and plug being removable to enable the journal box to be pulled from the axle.

(References on following page)

References Cited

UNITED STATES PATENTS

| | | | |
|---|---|---|---|
| 1,777,068 | 9/1930 | Benica et al. | 105—222 |
| 2,094,235 | 9/1937 | Gibbons et al. | 105—218 XR |
| 2,129,405 | 9/1938 | Bugatti | 105—222 XR |
| 2,176,244 | 10/1939 | Brittain | 105—218 |
| 2,724,346 | 11/1955 | Borgeaud | 105—222 |

ARTHUR L. LA POINT, *Primary Examiner.*

H. BELTRAN, *Assistant Examiner.*

UNITED STATES PATENT OFFICE
CERTIFICATE OF CORRECTION

Patent No. 3,399,634                            September 3, 1968

Angelo Zunich

It is certified that error appears in the above identified patent and that said Letters Patent are hereby corrected as shown below:

In the heading to the printed specification, lines 4 and 5, "Angelo Zunich, Hobart, Ind., assignor to United States Steel Corporation, a corporation of Delaware" should read -- Angelo Zunich, 309 South Indiana St., Hobart, Ind. 46342 --.

Signed and sealed this 3rd day of February 1970.

(SEAL)
Attest:

Edward M. Fletcher, Jr.                        WILLIAM E. SCHUYLER, JR.
Attesting Officer                                Commissioner of Patents